United States Patent Office 3,232,922
Patented Feb. 1, 1966

3,232,922
NOVEL DIACYL PEROXIDES AND POLYMERIZATION PROCESSES EMPLOYING SAME
James E. Guillet, James P. Hawk, and Edmund B. Towne, Kingsport, Tenn., assignors to Eastman Kodak Company, Rochester, N.Y., a corporation of New Jersey
No Drawing. Filed Dec. 28, 1961, Ser. No. 162,968
14 Claims. (Cl. 260—94.9)

This invention relates to the polymerization of ethylenically unsaturated polymerizable compounds and particularly the novel catalysts useful for this purpose. In a specific aspect this invention relates to novel diacyl peroxides and their use as catalysts in the polymerization of ethylenically unsaturated polymerizable compounds.

It is known that ethylenically unsaturated compounds, and particularly ethylene, can be polymerized at temperatures in the range of about 40° to about 400° C. at atmospheric or higher pressures, for example, 5,000 p.s.i. or higher. Catalysts that have been suggested for use in these processes include oxygen, per-salts, diacyl peroxides, metal alkyls and azo compounds. In such processes the physical properties of a polymer, and particularly an ethylene polymer, depend, to a large extent, on the temperature of the polymerization. Thus, at low temperatures, high density ethylene polymers are prepared while, at higher temperatures, low density polymers are prepared. Furthermore, when ethylene is polymerized in a continuous system at temperatures of at least 200° C., and preferably at a temperature in the range of about 200 to about 250° C., it has been found that the resulting polymer exhibits improved flow properties. However, but for a few noteworthy exceptions, prior art diacyl peroxides that are employed in the many varying continuous polymerization reactions are deficient as wholly desirable polymerization catalysts, particularly at elevated temperatures. For example, straight chain diacyl peroxides such as lauroyl peroxide are ineffective at temperatures above 200° C. because they decompose too rapidly at these high temperatures. Furthermore, α-substituted diacyl peroxides are effective catalysts for the polymerization of ethylenically unsaturated compounds only at temperatures up to about 100° C. It is evident, therefore, that the state of the art will be greatly enhanced by providing diacyl peroxide catalysts that are effective for the polymerization of ethylenically unsaturated compounds, and particularly in the continuous polymerization of ethylene at temperatures of 200° C. and higher, for example, temperatures in the range of about 200° to about 250° C. Likewise, a noteworthy contribution to the art will be a method for the polymerization of ethylenically unsaturated compounds employing such catalysts.

A further limitation upon the use of organic peroxides in general, and particularly in their use as polymerization catalysts, is their high sensitivity to heat which makes them potentially hazardous chemicals. When proper temperature controls are used, many of these organic peroxides can be handled in industry without serious danger. However, certain types of peroxides are also sensitive to shock and this may cause them to detonate in pumps or other equipment even when their temperature is maintained at a low level. To test the sensitivity of a peroxide on a laboratory scale, small samples are subjected to impact by a dropping weight. The amount of gas given off by the sample is determined and used as the measure of the amount of decomposition. The sensitivity of the compound is established either by the height required to cause the compound to decompose or by the dilution required to make it insensitive to the impact of a weight dropped from the maximum height available with the testing instrument. Organic peroxides which exhibit shock sensitivity cause special hazards which make them undesirable for many commercial uses. It is obvious, therefore, that an organic peroxide catalyst which has a high efficiency in catalyzing the polymerization of ethylenically unsaturated compounds, particularly at elevated temperatures, and is insensitive to shock would be a substantial contribution to the art.

Accordingly, it is an object of this invention to provide novel diacyl peroxide catalysts that are effective to polymerize unsaturated polymerizable compounds.

Another object of this invention is to provide diacyl peroxide catalysts that are effective to polymerize ethylenically unsaturated polymerizable compounds, and particularly ethylene, at temperatures of 200° C. and higher.

Another object of this invention is to provide diacyl peroxide catalysts that are insensitive to shock so that they can be handled without special precautions in commercial equipment, making them safe for commercial operation in the polymerization of ethylenically unsaturated polymerizable compounds.

Still another object of this invention is to provide a process for the polymerization of ethylenically unsaturated polymerizable compounds in the presence of novel diacyl peroxides.

Other objects will become apparent upon an examination and consideration of the specification and claims which follow.

In accordance with this invention it has been found that novel diacyl peroxides which do not exhibit shock sensitivity, as hereinafter described, are extremely effective polymerization catalysts for polymerizable ethylenically unsaturated compounds such as ethylene, particularly at elevated temperatures, for example 200° C. and higher.

The novel diacyl peroxides used in the practice of this invention are represented by the following formula:

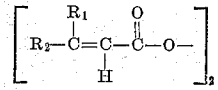

wherein $R_1$ is an alkyl, cycloalkyl or alkaryl group, desirably containing from 2 to 17 carbon atoms, and $R_2$ is hydrogen or a lower alkyl group, desirably containing 1 to 4 carbon atoms. These novel diacyl peroxides are characterized by a double bond in the 2 position from the carbonyl group. An unexpected feature of the invention is that if the double bond is in any other position, the compounds are no longer effective catalysts in the polymerization of ethylenically unsaturated polymerizable compounds at the desired elevated temperatures. Thus, in those compounds where the double bond is in the 3 position the peroxide will decompose at even lower temperatures than the α-substituted diacyl peroxides of the prior art and the radical formed in the decomposition has a low efficiency for initiation of polymerization of monomers such as ethylene. When the double bond is further from the carbonyl group, such as in the 4 or 5 position, the peroxide decomposes in the same temperature range as a straight chain saturated diacyl peroxide. In contrast, the compounds of this invention are extremely effective catalysts for the polymerization of ethylenically unsaturated polymerizable compounds, particularly at elevated temperatures, for example 200° C. or higher.

Another surprising feature of this invention is that peroxides that are closely related in structure to those employed in the practice of this invention, for example, peroxides in which $R_1$ and $R_2$ in the above formula are hydrogen, are not suitable polymerization catalysts because they are very sensitive to shock, possibly because they tend to polymerize by addition at the vinyl double bond to give a polymeric peroxide. In contrast, however, the novel peroxides of this invention, in which $R_1$ and $R_2$ are as defined, are stable compounds which have the properties desired for a polymerization catalyst, particularly at elevated temperatures.

The $R_1$ radicals, as indicated above, can be any alkyl, cycloalkyl or alkaryl group. In general, it is desirable to employ compounds in which $R_1$ contains a maximum of 17 carbon atoms and a minimum of 2 carbon atoms. Suitable $R_1$ radicals, therefore, include ethyl, propyl, isopropyl, butyl, hexyl, decyl, dodecyl, tetradecyl, hexadecyl, heptadecyl, tolyl, propyl and dibutyl substituted phenyl, cyclopentyl, cyclohexyl, cycloheptyl and the like. As already indicated, $R_2$ can be hydrogen or a lower alkyl group. Particularly good results are obtained with lower alkyl radicals containing 1 to 4 carbon atoms. Examples of suitable lower alkyl radicals include, methyl, ethyl, propyl, butyl and the like. Hence, examples of the novel diacyl peroxides employed in the practice of this invention include bis(2-pentenoyl) peroxide, bis(2-nonenoyl) peroxide, bis(4-ethyl-2-octenoyl) peroxide, bis(3-methyl-2-pentenoyl) peroxide, bis (3-methyl-4-phenyl-2-butenoyl) peroxide, bis(4-cyclohexyl-2-butenoyl) peroxide, bis(2-tetradecenoyl) peroxide, bis(2-eiscosenoyl) peroxide, bis(4,4-dimethyl-2-heptenoyl) peroxide, bis(4-ethyl-6-methyl-2-octenoyl) peroxide and the like.

A convenient method for preparing the novel peroxides employed in the practice of this invention comprise reacting an acyl halide having the formula:

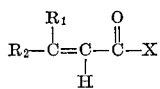

wherein $R_1$ and $R_2$ are as defined above and X is a halide, for example, chlorine or bromine, with an inorganic peroxide such as an alkali or alkaline earth metal peroxide, for example, sodium, calcium or barium peroxide at a relatively low temperature such as $-40°$ C. to $+5°$ C. and preferably between about $-5°$ C. and about $+5°$ C. While the reaction mixture may be allowed to rise to higher temperatures up to about 25° C., for example, as a precautionary measure, temperatures in excess of 50° C. are inadvisable. In a preferred mode of preparing these peroxides a toluene solution of the halide is added gradually, as for example, dropwise, at a temperature in the range hereinbefore disclosed, to an aqueous solution or slurry of the alkali or alkaline earth metal peroxide. The reaction is continued to completion which is usually of a period of not more than 4 hours after mixing the reactants. The resulting peroxide can then be isolated by any of the conventional concentration procedures usually employed for this purpose. Although not essential, it is usually desirable to use an excess of the inorganic peroxide in the reaction.

Other reaction media besides water, for example, water soluble alcohols such as ethanol, methanol and mixtures of water with these alcohols can be employed to dissolve the inorganic peroxide. Best results are in general obtained with water alone. The amount of water employed is subject to wide variation. Twenty to one hundred parts of water per part of metal peroxide, for example, usually give satisfactory results. Furthermore, any of the aliphatic, cycloaliphatic or aromatic solvents can be used as solvents for the halide reactant. A number of such solvents are known in the art, as exemplified by benzene, toluene, heptane and the like.

The unsaturated acids from which the novel peroxides are synthesized can themselves be synthesized by reacting ketene with the appropriate aldehyde and hydrolyzing. Other methods generally employed by those skilled in the art can also be employed. For example, 4-ethyl-2-octenoic acid can be synthesized by reacting ketene with 2-ethylhexanal followed by hydrolysis of the intermediate β-lactone to give the β-unsaturated acid. The acid is treated with thionyl chloride to give the acid chloride, which is then reacted with alkaline hydrogen peroxide to give the desired diacyl peroxide, as outlined above.

The temperatures employed in the polymerization reaction are subject to wide variation and depend upon such variable factors as the monomer employed, the duration of heating, the pressure employed, the type of product desired and the type of process, for example, continuous or batch. In general, however, the novel peroxides disclosed herein can be used as polymerization catalysts over a broad temperature range of about 50° to about 250° C. In the polymerization of ethylene, temperatures in the range of about 90° to about 250° C. generally give very good results. For the continuous polymerization procedures, with short contact times, temperatures in the range of about 180° to about 250° C. are generally employed with ethylenically unsaturated polymerizable compounds other than ethylene. With contact times longer than 2 hours, lower temperatures, for example, 50° C. are generally employed.

The pressure employed in the polymerization, if any, is also subject to wide variation and can be any of the pressures generally employed in such processes. The pressures used will depend, to a large extent, upon the properties of the polymer desired and, for ethylene, will generally be in the range of about 100 to about 3,000 atmospheres and preferably in the range of about 500 to about 2,500 atmospheres. Where ethylenically unsaturated polymerizable compounds other than ethylene, for example, styrene, methyl methacrylate, acrylonitrile or vinyl chloride are polymerized, the reaction proceeds very well at atmospheric pressure, with pressures in the range of 1 to about 200 atmospheres being particularly satisfactory.

The catalyst concentrations employed in practicing the invention include the concentrations generally employed in free radical polymerization processes. Thus, when ethylene is polymerized, the catalyst concentration is generally in the range of about 5 to 500 parts per million, based on the weight of ethylene. At low ethylene pressures, for example, below 500 atmospheres, or when other ethylenically unsaturated monomers are polymerized, the catalyst concentrations will generally range from about .01 to about 2%, based on the weight of monomer. It is also possible to employ chain transfer agents, as exemplified by hydrogen, propane, chlorinated hydrocarbons or mercaptans, in the process of this invention. Catalyst activators, for example, sulphites, aromatic amines, sulphur dioxide, dimethyl anilin and the like can also be employed.

The novel catalysts of this invention are extremely versatile and can be employed in the polymerization of any one or mixtures of ethylenically unsaturated polymerizable compounds containing at least one $CH_2=C<$ group and particularly those containing a $CH_2=CH-$ group. These catalysts are particularly suited to the polymerization of monoethylenically unsaturated polymerizable compounds containing 2 to 10 carbon atoms or mixtures thereof. Suitable polymerizable compounds included within the scope of this invention include ethylene, propylene, butene, decene, styrene, acrylic acid, methyl methacrylate, vinyl chloride, vinylidene chloride, butadiene, isoprene and the like.

This invention can be further illustrated by the following examples of preferred embodiments thereof although it will be understood that these examples are included merely for purposes of illustration and are not intended to limit the scope of the invention unless otherwise specifically indicated.

*Example 1*

As already indicated, the novel diacyl peroxides of this invention can be prepared by reacting the corresponding acyl halide with an inorganic peroxide at a relatively low temperature. Thus, to a mixture of 8 ml. of 5% NaOH, 8.0 ml. of $H_2O$ and 0.55 ml. of 30% $H_2O_2$ cooled to 5°

C., is slowly added 1.75 g. of 2-nonenoyl chloride in 3.0 ml. of toluene. The reaction is allowed to continue at 5° C. for 3 hours. Twenty-five ml. of toluene is added. The toluene layer is washed once with NaOH solution, and three times with $H_2O$. The solution is dried over $CaSO_4$ at 0° C., for about 15 hours. The solution has an infrared spectrum showing it to be essentially bis(2-nonenoyl)-peroxide. [Carbonyl absorption at 1762 and 1785 cm.$^{-1}$ and internal unsaturations at 1639 cm.$^{-1}$.] It liberates iodine from acidified anhydrous sodium iodide and evolves gas when heated up to 100° C. The half life in toluene of a 1% solution is 405,000 seconds at 56° C. and 231,000 seconds at 61° C. The peroxide is a liquid at temperatures of 0° C. and lower, and is miscible with hydrocarbon solvents. When subjected to the shock sensitivity test outlined hereinbefore, involving energy of 400 inch pounds transmitted across an area of .075 sq. in., bis(2-nonenoyl)peroxide is found to be insensitive to shock.

To illustrate the very desirable results obtained using the novel peroxides of this invention as polymerization catalysts, 1 ml. of a solution containing 5 mg. of bis(2-nonenoyl)peroxide in toluene is placed in a high pressure autoclave. The autoclave is closed, purged with oxygen-free ethylene and pressured with ethylene to give 20,000 p.s.i. ethylene pressure at 100° C. The reaction is continued for two hours after which time, the unreacted ethylene is vented and 5.55 g. of white polyethylene powder is removed from the autoclave.

*Example 2*

Using the procedure of Example 1, bis(4-ethyl-2-octenoyl)peroxide is prepared by reaction of 4-ethyl-2-octenoyl chloride in toluene solution with sodium peroxide in aqueous solution at 0° C. The toluene solution of the peroxide so formed is washed with ice water until neutral and concentrated by removal of the toluene under vacuum. The rate of decomposition of the peroxide is determined in odorless mineral spirits at a concentration of 1 g./100 cc. by heating samples in a constant temperature bath and titrating the residual peroxide with potassium iodide. The half-life $\tau$ at various temperatures is given in Table I below. Pure bis(4-ethyl-2-octenoyl)peroxide is tested for shock and found to be insensitive to shock at the maximum height available in the drop weight test. The energy involved is 400 inch pounds transmitted across an area of 0.75 sq. in.

TABLE I

| Temperature, °C.: | Half-life ($\tau$), seconds |
|---|---|
| 88 | 13,600 |
| 100 | 716 |
| 118 | 257 |

To illustrate the superior polymerization efficiency of the peroxides of this invention over prior art peroxide catalysts at higher temperatures, a 100 cc. stainless steel autoclave equipped with a magnetic agitator is charged with the peroxide catalyst in benzene solution. The autoclave is flushed with ethylene, pressured with ethylene to the desired level and the temperature raised to reaction temperature. The reaction pressure is maintained by addition of compressed gas for a period of two hours, after which the reactor is cooled down and the unreacted ethylene vented. The polymer is recovered from the autoclave in the form of a dry, spongy mass. Using this procedure the efficiency of several of the diacyl peroxide catalysts, including the bis(4-ethyl-2-octenoyl)peroxide prepared above, is compared with a prior art high temperature catalyst. The results of these runs together with the conditions employed are set forth in the following table.

TABLE II.—CATALYST EFFICIENCY (G. POLYMER PER G. CATALYST)

| Temperature, °C. | Lauroyl peroxide | Bis (4-ethyl-2-octenoyl) peroxide | Bis (4,4-dimethyl 2-heptenoyl) peroxide | Bis (2-nonenoyl) peroxide | Bis (2-pentenoyl) peroxide | Bis (4-ethyl-6-methyl-2-octenoyl) peroxide |
|---|---|---|---|---|---|---|
| 90 |  |  | 1,300 |  |  |  |
| 100 | 500 |  |  |  |  | 2,400 |
| 140 | 1,300 | 2,600 |  |  |  | 1,800 |
| 160 | 250 | 2,900 | 1,950 | 530 |  | 1,150 |
| 180 | 200 | 3,500 | 2,300 | 820 | 4,500 | 2,000 |

Conditions: 1 mg. peroxide, 100 cc. autoclave, 2 hours at 20,000 p.s.i. ethylene pressure.

From an examination of the above table it is obvious that the novel diacyl peroxides are extremely effective catalysts at temperatures above the most effective for prior art catalysts such as lauroyl peroxide. This effect is even more pronounced in a continuous polymerization system. Thus, in a continuous stirred reactor operating at a pressure of 20,000 lb./sq. in. and a contact time of approximately 2–5 min., the minimum operating temperature for lauroyl peroxide is about 170° C. and the maximum operating temperature about 210° C. In contrast, the novel diacyl peroxides of this invention such as bis(4-ethyl-2-octenoyl)peroxide, for example, operate effectively at temperatures up to about 250° C. In batch reactions, on the other hand, where contact times of two hours are used bis(4-ethyl-2-octenoyl)peroxide is most effective in the temperature range from about 140–200° C. whereas, lauroyl peroxide is most effective in the range from 90 to about 150° C.

*Example 3*

A small stainless steel autoclave is equipped with a magnetic stirrer and inlet and outlet valves so that the pressure can be maintained constant while product is removed continuously from the reaction into a reservoir at lower pressure. The free volume of the stirred autoclave is 85 cc. Catalyst is pumped continuously into the ethylene feed line which is chilled so that no reaction takes place until the mixture reaches the stirred zone of the autoclave. The pressure in the autoclave is raised to 14,000 lb./sq. in. and the temperature to 214° C. When temperature equilibrium is attained, a solution of one percent bis(4-ethyl-2-octenoyl)peroxide in heptane solution is pumped to the autoclave at a rate of 90 cc./hr. The pumping rate of the ethylene is 1100 g./hr. and the contact time is approximately three minutes. Reaction starts almost immediately as evidenced by an increase in the reaction temperature in the autoclave to 235° C. After passing through the autoclave the polymer, dissolved in high-pressure ethylene, is fed to a separator maintained at 150° C. where the pressure is reduced to 3,000 lb./sq. in. and the excess ethylene vented. The reaction is run as described above for 30 minutes, after which the catalyst pump is cut off, the reactor vented and the separator cooled to room temperature. Yield of polymer is 53.8 g. which corresponds to a conversion of about 11 percent of the total ethylene pumped. The polymer has a melt index of 11.1 and a density of 0.915. When this polymer is compression molded, it gives a tough, flexible plastic sample.

*Example 4*

The continuous reaction of Example 3 is repeated except that the temperature is maintained at 215° C. for 23 minutes. 21.1 g. of polyethylene is obtained having a density of 0.917 and a melt index of about 20.

Example 5

As already pointed out, prior art peroxide catalysts, particularly in continuous type processes, are not nearly as efficient as the catalysts of this invention when elevated temperatures are used. To illustrate, the continuous reaction of Example 3 is repeated except that a 1% solution of lauroyl peroxide in benzene is pumped to the reactor. Although the pumping rate of catalyst is nearly double that as used for this bis(4-ethyl-2-octenoyl)peroxide, the yield of polymer is only 1.7 g. after running for 35 minutes.

Example 6

Bis(4,4-dimethyl-2-heptenoyl)peroxide is synthesized according to the procedure of Example 1 by the reaction of sodium peroxide with 4,4-dimethyl-2-heptenoyl chloride. The yield is 82 percent, based on the starting material. The half life of this peroxide when measured at a one percent concentration in odorless mineral spirits at 103° C., is 591 seconds; at 75° C. is 17,900 seconds, and at 90° C. is 2,910 seconds. Shock sensitivity tests run on a small sample of this peroxide after removal of the solvent by vacuum distillation show that it is insensitive to shock at the maximum height of the drop weight tester.

Using 1 mg. of catalyst at 20,000 lb./sq. in., yields of 1.95 g., 2.30 g. and 3.3 g. are obtained at temperatures of 160°, 180° and 200° C. respectively.

Example 7

Bis(2-pentenoyl)peroxide is synthesized by reaction of sodium peroxide with 2-pentenoyl chloride using the procedure of Example 1. The yield is 75 percent.

Batch scale polymerization tests are run on this peroxide as described in Example 2. At 180° C. and 20,000 lb./sq. in. pressure a yield of 4.5 g. of polyethylene is obtained from 1 mg. of catalyst. At 200° C., the yield is 6.2 g.

Example 8

The peroxide catalysts of this invention are extremely versatile in that they can be used in the polymerization of any polymerizable ethylenically unsaturated compounds, particularly those containing 2 to 10 carbon atoms. Hence, 20.0 g. of styrene is placed in a vial with 0.10 g. of bis(4,4-dimethyl-2-heptenoyl)peroxide. The vial is flushed with nitrogen, sealed, and heated to 100° C. for six hours. The resulting polymer is dissolved in toluene and precipitated with methanol. After drying, a yield of 19.2 g. of solid polystyrene is obtained having an intrinsic viscosity of 0.31 in toluene.

Example 9

20.0 g. of purified methylmethacrylate monomer is placed in a vial with 0.02 g. of bis(4-ethyl-2-octenoyl)peroxide. The vial is flushed with nitrogen, sealed and heated to 110° C. for two hours. After cooling to room temperature, the vial is opened and the polymer is dissolved in ethyl acetate and precipitated with methanol. After drying, the yield of polymer is 17.6 g. having an intrinsic viscosity of 1.2 in ethyl acetate solution.

Example 10

To a mixture of 16 ml. of aqueous 5% NaOH and 1.1 ml. of 30% $H_2O_2$ cooled to 5° C. is slowly added 3.49 g. of 4,4-dimethyl-2-heptenoyl chloride in 5 ml. of heptane. The reaction is carried out for 3 hours. The heptane layer is washed with dilute NaOH solution and water and dried over $CaSO_4$. Heptane is stripped under vacuum from a 2-ml. sample. The liquid residue has a refractive index $n_D^{20}=1.4578$. Its infrared spectrum shows it to be principally bis(4,4-dimethyl - 2 - hexenoyl)peroxide [carbonyl absorption at 1762 and 1788 cm.$^{-1}$ and internal unsaturation at 1639 cm.$^{-1}$]. It liberates iodine from an anhydrous sodium iodide solution and evolves gas when heated to 90 to 100° C. The peroxide is a liquid at 0° C. but crystallizes at slightly lower temperature and is miscible with hydrocarbon solvents.

The diacyl peroxide prepared according to this procedure is an extremely effective polymerization catalyst. Thus, 1 ml. of a solution of bis(4,4-dimethyl-2-heptenoyl) peroxide in odorless mineral spirits containing 1.0 mg. of the peroxide is placed in a high pressure autoclave. The autoclave is sealed, purged with oxygen-free ethylene and the autoclave is then pressured to 20,000 p.s.i. of ethylene at 180° C. The reaction is carried out for 2 hours after which time the autoclave is cooled, vented and 5.35 g. of white polyethylene powder is removed.

Example 11

Bis(4-ethyl-2-octenoyl)peroxide is prepared from the acid chloride using alkaline hydrogen peroxide as described in Example 10. After removal of solvent, the residue has an infrared spectrum showing it to consist principally of bis (4-ethyl-2-octenoyl)peroxide [carbonyl absorption bands at 1790 cm.$^{-1}$ and 1770 cm.$^{-1}$ and an unsaturation absorption band at 1640 cm.$^{-1}$]. It liberates iodine from acidified anhydrous sodium iodide and evolves gas on being heated to 90° to 110° C. The liquid residue, after vacuum stripping, is 78% peroxide and is insensitive to mechanical shock. The peroxide is a liquid at 0° C.

One milliliter of a solution of bis(4-ethyl-2-octenoyl) peroxide in heptane containing 1.0 mg. of the peroxide is placed in a high pressure autoclave. The autoclave is sealed, purged with oxygen-free ethylene and pressured to 20,000 p.s.i. ethylene pressure at 200° C. The reaction is carried out for two hours after which time the autoclave is cooled, vented and 5.0 g. of white polyethylene powder is removed.

Thus, this invention provides a new class of diacyl peroxides which can be used in the polymerization of ethylenically unsaturated polymerizable compounds such as ethylene, particularly at higher temperatures. These catalysts, since they are insensitive to shock, can be handled without special precautions in commercial equipment.

This application is a continuation-in-part of application Ser. No. 33,877, filed June 6, 1960, and now U.S. Patent 3,119,802.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A diacyl peroxide having the formula:

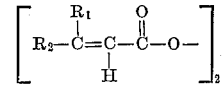

where $R_1$ is a member selected from the group consisting of alkyl, cycloalkyl and alkaryl radicals containing 2 to 17 carbon atoms and $R_2$ is a member selected from the group consisting of hydrogen and lower alkyl radicals.

2. Bis(4-ethyl-2-octenoyl)peroxide.
3. Bis(4,4-dimethyl-2-heptenoyl)peroxide.
4. Bis(2-nonenoyl)peroxide.
5. Bis(2-pentenoyl)peroxide.
6. Bis(4-ethyl-6-methyl-2-octenoyl)peroxide.
7. The process for the polymerization of ethylenically unsaturated polymerizable compounds containing a $$CH_2=C<$$

group which comprises polymerizing said compound at a pressure in the range of about atmospheric pressure to about 3,000 atmospheres and a temperature in the range of about 50° to about 250° C. in the presence of a diacyl peroxide having the formula:

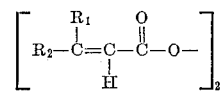

where $R_1$ is a member selected from the group consisting of alkyl, cycloalkyl and alkaryl radicals containing 2 to 17 carbon atoms and $R_2$ is a member selected from the group consisting of hydrogen and lower alkyl radicals.

8. The process of claim 7 in which the diacyl peroxide is bis(4-ethyl-2-octenoyl)peroxide.

9. The process of claim 7 in which the diacyl peroxide is bis(4,4-dimethyl-2-heptenoyl)peroxide.

10. The process of claim 7 in which the diacyl peroxide is bis(2-nonenoyl)peroxide.

11. The process of claim 7 in which the diacyl peroxide is bis(2-pentenoyl)peroxide.

12. The process of claim 7 in which the diacyl peroxide is bis(4-ethyl-6-methyl-2-octenoyl)peroxide.

13. The process which comprises polymerizing ethylene at a pressure in the range of about 500 to about 3,000 atmospheres and a temperature in the range of about 90° to about 250° C. in the presence of a diacyl peroxide having the formula:

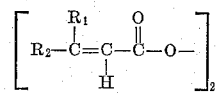

where $R_1$ is an alkyl radical containing 2 to 17 carbon atoms and $R_2$ is hydrogen.

14. The process of claim 13 in which $R_2$ is a lower alkyl radical.

References Cited by the Examiner

UNITED STATES PATENTS

| | | | |
|---|---|---|---|
| 2,379,390 | 6/1945 | Tuerck | 260—610 |
| 3,019,214 | 1/1962 | Pajaczkowski | 260—94.9 |
| 3,119,802 | 1/1964 | Guillet et al. | 260—94.9 |

J. L. SCHOFER, *Primary Examiner.*